United States Patent
Maes (10) Patent No.: US 9,407,795 B2
(45) Date of Patent: Aug. 2, 2016

(54) METHOD OF READING OUT A CMOS IMAGE SENSOR AND A CMOS IMAGE SENSOR CONFIGURED FOR CARRYING OUT SUCH METHOD

(75) Inventor: Willem Hendrik Maes, Lommel (BE)

(73) Assignee: Teledyne Dalsa B.V., Eindhoven (NL)

( * ) Notice: Subject to any disclaimer, the term of this patent is extended or adjusted under 35 U.S.C. 154(b) by 3 days.

(21) Appl. No.: 14/413,328

(22) PCT Filed: Jul. 13, 2012

(86) PCT No.: PCT/EP2012/063798
§ 371 (c)(1),
(2), (4) Date: Jul. 23, 2015

(87) PCT Pub. No.: WO2014/008946
PCT Pub. Date: Jan. 16, 2014

(65) Prior Publication Data
US 2015/0319383 A1    Nov. 5, 2015

(51) Int. Cl.
*H04N 3/14* (2006.01)
*H04N 5/355* (2011.01)
*H04N 5/374* (2011.01)
*H04N 5/378* (2011.01)

(52) U.S. Cl.
CPC ............. *H04N 3/155* (2013.01); *H04N 5/3559* (2013.01); *H04N 5/374* (2013.01); *H04N 5/378* (2013.01)

(58) Field of Classification Search
CPC ....... H04N 3/155; H04N 5/374; H04N 5/378; H04N 5/3559
See application file for complete search history.

(56) References Cited

U.S. PATENT DOCUMENTS

| 6,731,335 B1 * | 5/2004 | Kim ..................... H04N 3/155 348/241 |
| 2005/0224843 A1 | 10/2005 | Boemler |
| 2005/0280713 A1 * | 12/2005 | Hagihara ............... H04N 3/155 348/207.99 |
| 2006/0139471 A1 * | 6/2006 | Lee ..................... H04N 5/3575 348/308 |
| 2008/0210993 A1 | 9/2008 | Oshikubo et al. |
| 2009/0147119 A1 * | 6/2009 | Kamiyama ....... H01L 27/14609 348/308 |

FOREIGN PATENT DOCUMENTS

| WO | WO 2008/115500 | 9/2008 |
| WO | WO 2009/156927 | 12/2009 |

* cited by examiner

*Primary Examiner* — Twyler Haskins
*Assistant Examiner* — Padma Haliyur
(74) *Attorney, Agent, or Firm* — Snell & Wilmer LLP (57) ABSTRACT

The invention relates to a method of reading out a CMOS image sensor. The method includes setting a pixel (Pxl) in a first mode (SS) and resetting the pixel (Pxl) so the predefined voltage (V-ref) is set over the photo-diode (Dde) and the first capacitance (C_low). The method further includes collecting charge carriers that reduce the pixel potential (Vp) on the photo-diode (Dde). The method further includes reading out the pixel (Pxl) while in the first mode (SS) and a second mode (LS), and storing the pixel potential (Vp). The method further includes resetting the pixel (Pxl) such that the predefined voltage (V_ref) is over the photo-diode (Dde), the first capacitance (C_low), and the second capacitance (C_high). The method further includes reading out the pixel (Pxl) while in the second mode (LS) and the first mode (SS), and storing the pixel potential (Vp).

9 Claims, 4 Drawing Sheets

V_lfw = V_refl - V_sgl

V_hfw = V_refh - V_sgh

If (V_lfw < V_sat) Then
   V_out = V_lfw
Else
   V_out = V_hfw * GN  ⟶  GN = $\dfrac{C\_low + C\_high}{C\_low}$
END

*Fig. 8*

METHOD OF READING OUT A CMOS IMAGE SENSOR AND A CMOS IMAGE SENSOR CONFIGURED FOR CARRYING OUT SUCH METHOD

FIELD OF THE INVENTION

The invention relates to a method of reading out a CMOS image sensor, the CMOS image sensor comprising an array of pixels for sensing incident light. The invention further relates to such CMOS image sensor comprising an array of pixels for sensing incident light which is configured for carrying out said method.

BACKGROUND OF THE INVENTION

The invention relates to electronic image sensors and more particularly, those which work on the basis of active pixels in MOS technology. The invention relates notably to a method for controlling the various transistors that make up the pixels. The active pixels usually comprise a photodiode and three, four or five MOS transistors making it possible to control the reading of the charges generated by the light in the photodiode. The pixels with three transistors work by directly transferring to a column conductor the potential of the photodiode, a potential which varies according to the lighting and the light integration time. The pixels with four transistors work by first transferring from the photodiode to a capacitive conversion node the charges generated by the light, then by referring the potential of the conversion node to a column conductor; one of the transistors is used to reset the potential of the conversion node before the charge transfer from the photodiode to the conversion node. The pixels with five transistors also include a transistor for resetting the potential of the photodiode. This invention relates to a classical 3T pixel concept with transistors added to implement further functionality.

It is desired that the sensor should capture images that have the widest possible dynamic range, that is to say, pixels that generates a detectable signal in the very low lighting condition but also are capable of receiving very luminous imaging condition without saturation. A number of solutions have been sought to obtain a wide dynamic range, that is reducing the noise floor for low light condition and increasing the maximum charge capacity for highly illuminated images.

One solution consists in using a successive capture of a number of images with different integration times. If the signal supplied by a pixel that has undergone a long integration time is saturated, it is replaced by a signal from the same pixel, having undergone a short integration time. This presupposes taking several successive images and the overall acquisition time is long. Furthermore, the images have to be processed pixel by pixel in order to choose the most suitable signal for each before going on to a next image.

Another solution consists in having a mixed matrix with small pixels and large pixels. The small pixels, less sensitive, are used if there is a lot of light. A complex suitable processing is required and the overall resolution of the matrix is reduced.

Yet another solution consists in measuring the time that it takes a pixel to arrive at saturation to deduce therefrom information concerning the level of light in the presence of saturating lighting. This presupposes more complex pixels.

Solutions with pixels with logarithmic or linear-logarithmic function or with response curve slope variation have also been proposed for pixels with three transistors. These rely on a variation of the potential of the gate of the transistor for resetting the photodiode. These solutions are sensitive to technological dispersions: dispersion of threshold voltages of the transistors of the various pixels and dispersion of the no-load potential of the photodiode after reset.

WO99/34592 proposes a device whose read circuit comprises a first capacitor for storing a potential level for resetting the storage node of the pixel, a second capacitor for storing a potential level taken by the storage node after a first integration period, a third capacitor for storing a potential level taken by the storage node after a second integration period following the first but much shorter than the first, and a threshold circuit for comparing the potential level in the first capacitor with a threshold and using the potential stored in the second capacitor rather than in the first in the case where, as a result of excessively strong lighting, the threshold would be exceeded. This device requires three sampling in-pixel capacitors. Now, the sampling capacitors occupy a very large surface area in the read circuit (around 15% of the surface area for each capacitor). Also, the matrix image sensors are highly sensitive to an effect which is the fixed read noise in column mode. This noise results from the offset dispersions of the column amplifiers and is reflected in parallel vertical lines which are very visible to the eye when the images are displayed. There are methods for reducing it, but these methods do not apply if there are three capacitors. It should also be noted that if this noise is not eliminated, it is ultimately multiplied by the ratio of the integration periods in the case where the second capacitor is used rather than the first.

In the prior art also modified three-transistor (3T) CMOS image sensors pixels have been reported which have two operational modes, i.e. one for low-intensity images and one for high-intensity images. These modified 3T-CMOS image sensors are provided with an extra transistor (thus turning it into a 4T-CMOS image sensor) to implemented a dual full-well characteristic. The pixel charge capacity can be increased from low-full well to high full-well by increasing the capacitance of the pixel from a low value to a high value. The photo-diode in such circuit is preferably designed in such way that it only collects charge and does not store these charges. The storage is performed in the parallel added linear capacitors. This is achieved by using a largely-pinned photo-diode with a pinning potential with is preferably below a lower limit (for example 1V) of the linear range (working regime) of the in-pixel potential. The upper limit of this linear range is defined by the reset voltage (for example 3V). The selection of the respective mode, low full-well or high full-well is static. Such selection is typically made depending on the application. The advantage of the low full-well mode is the low noise floor generated within the pixel. The disadvantage of the low full-well mode is the low maximum pixel charge. The advantage of the high full-well mode is the large maximum pixel charge, the disadvantage of the high full-well mode is the higher noise floor.

The above-mentioned solutions all have their advantages and disadvantages. There is still a need for a non-complex solution which combines advantages of the various solutions mentioned without compromising too much on other features.

SUMMARY OF THE INVENTION

The proposed invention offers a solution for the earlier-described problems, i.e. the invention provides a solution, which combines the advantages of the various solutions without compromising too much on other features. The invention is defined by the independent claims. The dependent claims define advantageous embodiments.

In accordance with a first aspect of the invention a method of reading out a CMOS image sensor as described in claim 1 is provided. The image sensor in this method comprises an array of pixels for sensing incident light, wherein each pixel comprises a largely-pinned photo-diode arranged in reverse-bias, a first capacitance arranged parallel to the largely-pinned photo-diode, a switch, a second capacitance that can be switched in parallel with the first capacitance by closing the switch, and reset circuitry for resetting a pixel potential on the cathode of the photo diode to a predefined voltage. Each respective pixel can be set in a second mode by switching on the switch and thereby switching the second capacitance parallel to the first capacitance, and wherein each respective pixel can be set in a first mode by switching off the switch disabling the second capacitance. The method comprises steps of:

setting a respective pixel in the first mode;

resetting the respective pixel such that the predefined voltage is set over the photo-diode and the first capacitance;

collecting charge carriers generated by the incident light on the respective photo-diode, wherein the collected charge carriers reduce the pixel potential on the respective photo-diode;

reading out the respective pixel while set in the first mode and storing the pixel potential that was read as a first potential value;

reading out the respective pixel while set in the second mode and storing the pixel potential that was read as a second potential value;

resetting the respective pixel such that the predefined voltage is set over the photo-diode, the first capacitance, and the second capacitance;

reading out the respective pixel while set in the second mode and storing the pixel potential that was read as a third potential value, and reading out the respective pixel while set in the first mode and storing the pixel potential that was read as a fourth potential value.

The image sensor in accordance with the invention constitutes a significant improvement over the prior art devices. The pixel circuit used in the method of the invention is known. It is a classical 3T pixel with an additional switch and a capacitor. However, the read-out method is quite different from the prior art. In the method of the invention, after the integration phase in the first mode (low full-well!!), the pixel is read-out twice, one time in the first mode (i.e. low full-well mode) and one time in the second mode (i.e. high full-well mode). Subsequently, the pixel is reset such that the predefined voltage is set over both diode and both capacitors. Then, the pixel is again read-out twice, one time in the second mode, and one time in the first mode (in this example the order of modes has been reversed, which saves one mode switch). All individual readings are stored, for instance on dedicated capacitors in the read-out circuit. By doing so, two read-outs are done on the same identical charge packet of the pixel. Each read-out comprises a signal measurement and a reference voltage measurement. The difference between these two measurements indicates the voltage drop on the photo diode during the integration phase and is a measure for the amount of light that was sensed. In the invention two such measurements are done after a single integration, one for the first mode (low full-well) and one for the second mode (high full-well). The decision of which of these measurements to take is done by investigating the value of the low full-well output first. If this value is near saturation (i.e. the voltage swing is larger than a predefined threshold), the value of the high full-well is selected, or else the value of the low full-well is taken. In case the high full-well value is taken, the value must be compensated by multiplying with the gain factor, which is the ratio between the sum of the first and the second capacitance and the first capacitance (i.e. this is the inverse of the attenuation of the signal due to putting the second capacitance parallel to the first capacitance). A major advantage of this read-out method is that the dynamic range is significantly increased, while maintaining the low noise-floor as determined by the first capacitance that is used in the low full-well (first) mode.

In order to facilitate the understanding of the invention a few expressions are defined hereinafter.

Throughout this description the term "largely-pinned photo diode" means a photo diode for which the parasitic capacitance is very small (or rapidly reduces) for voltages above the so-called pinning voltage. In the invention this implies that, when the pinning voltage is selected to be below the linear range of the pixel potential (potential over the photo-diode and first capacitor), the diode does not store or hardly stores any pixel charge (additional charge above low full-well storage is stored intermediate on the photo-diode during integration time). This charge is then stored in the first capacitance and optionally in the second capacitance (in the high full-well mode).

Throughout this description the term "low full-well mode" means the first mode, wherein the second capacitance is not switched parallel to the photo diode.

Throughout this description the term "high full-well mode" means the second mode, wherein the second capacitance is switched parallel to the photo diode and the first capacitance.

The term "substrate" may denote any suitable material, such as a semiconductor, glass, plastic, etc. According to an exemplary embodiment, the term "substrate" may be used to define generally the elements for layers that underlie and/or overlie a layer or a portion of interest. Also, the substrate may be any other base on which a layer is formed, for example a semiconductor wafer such as a silicon wafer or silicon chip. A semiconductor substrate may comprise a material of the group comprising: a group IV semiconductor (such as silicon or germanium), and a group III-group V compound semiconductor (such as gallium arsenide).

The term "semiconductor device" may denote a transistor or a circuit comprising a plurality of transistors and interconnections. The transistor may be a field effect transistor for example.

The term "field effect transistor" (FET) may denote a transistor in which an output current (source-drain current) may be controlled by the gate-source voltage. Such FET structure may be an MOSFET. The semiconductor device can be any integrated circuit and may comprise logic circuitry, photo sensitive cells, memory cells, and the like. The material of the semiconductor structure may be silicon, germanium, or any other semiconductor material.

As the invention is mainly related to a method of reading out an image sensor rather than to circuits the description does not elaborate in much detail on the operation of CCD and CMOS imagers. Such knowledge is considered to be known to the person skilled in the art.

In an embodiment of the method each pixel within the CMOS image sensor further comprises a further switch and a third capacitance that can be switched in parallel with the first capacitance and second capacitance by closing both the switch and the further switch, wherein the respective pixel can be set in a third mode by switching on both the switch and the further switch and thereby switching the third capacitance parallel to the first capacitance and the second capacitance. The method further comprises, before the step of resetting the respective pixel, a step of: reading out the respective pixel while set in the third mode and storing the pixel potential that was read as a fifth potential value. This embodiment of the method further comprises, after the step of resetting the respective pixel, a step of: reading out the respective pixel while set in the third mode and storing the pixel potential that was read as a sixth potential value. Furthermore, in this embodiment of the method, during the step of resetting the respective pixel, the predefined voltage is set over the third capacitance as well. This embodiment makes it clear that the gist of the invention may be applied multiple times. A new pixel architecture is provided having more than two, i.e. three or more operational modes. In an embodiment such pixel architecture then comprises a further switch and a further capacitance, such that in a third operational mode this third capacitance is arranged in parallel to the second and first capacitance. This will increase the dynamic range even further by increasing the maximum charge capacity, while maintaining the low noise floor that is determined by the first capacitance. In a variation of this embodiment the switches are controlled independently, i.e. rendering other combinations of capacitors possible, such as: the first and the second capacitance, the first and the third capacitance, and all capacitances together.

In accordance with a second aspect, the invention provides a CMOS image sensor as described in claim 3. The image sensor comprises an array of pixels for sensing incident light, wherein each pixel comprises a largely-pinned photo-diode arranged in reverse-bias, a first capacitance arranged parallel to the largely-pinned photo-diode, a switch, a second capacitance that can be switched in parallel with the first capacitance by closing the switch, and reset circuitry for resetting a pixel potential on the cathode of the photo diode to a predefined voltage. Each respective pixel can be set in a second mode by switching on the switch and thereby switching the second capacitance parallel to the first capacitance, and each respective pixel can be set in a first mode by switching off the switch disabling the second capacitance. The CMOS image sensor further comprises a read-out circuit that is coupled to the plurality of pixels, and wherein the CMOS image sensor is configured for reading out and storing respective pixel potentials of said pixels in said modes in the manner as described in claim 1 or 2.

In an embodiment of the CMOS image sensor the second capacitance is equal to or larger than the first capacitance. By doing so the dynamic range of the CMOS image sensor is at least doubled.

In an embodiment of the CMOS image sensor the pinning potential of photo-diode is lower than a lower limit of the linear range of the pixel potential such that within the linear range of the pixel the photo-diode does not substantially store the charge carriers generated by the incident light. The advantage of this embodiment is that within the linear range (normal operation range) of the pixel potential no charge carriers are stored in the photo-diode. The consequence is that the noise floor is determined by the first capacitance only. It must be noted that outside the linear region the photo-diode will store intermediate (excess) generated carriers. These carriers will be completely transferred to the second capacitance when closing the switch. This will change the conversion factor (electrons/volt) which is always the inverse of the total capacitance (sum of first capacitance second capacitance in the second mode).

In an embodiment of the CMOS image sensor the read-out circuit comprises:
a first capacitor for storing the first potential value;
a second capacitor for storing the second potential value;
a third capacitor for storing the third potential value, and
a fourth capacitor for storing the fourth potential value.

This embodiment constitutes a first option for storing the measured values for the first and the second mode. An alternative option is to store the respective values in an external memory, for instance in a computer.

In an embodiment of the CMOS image sensor each pixel within the CMOS image sensor further comprises a further switch and a third capacitance that can be switched in parallel with the first capacitance and second capacitance by closing both the switch and the further switch, wherein the respective pixel can be set in a third mode by switching on both the switch and the further switch and thereby switching the third capacitance parallel to the first capacitance and the second capacitance. The advantage of this embodiment may be exploited in different manners. Either, the dynamic range of this CMOS image sensor may be larger than in the other embodiments, or the dynamic range is chosen to be the same with a finer granularity\ or with a smaller gain ratio.

In an embodiment of the CMOS image sensor the read-out circuit further comprises:
a fifth capacitor for storing the fifth potential value, and
a sixth capacitor for storing the sixth potential value.

This embodiment constitutes a first option for storing the measured values for the third mode. An alternative option is to store the respective values in an external memory, for instance in a computer.

BRIEF DESCRIPTION OF THE DRAWINGS

These and other aspects of the invention are apparent from and will be elucidated with reference to the embodiments described hereinafter. In the drawings.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE NUMERALS

Pxl Pixel (circuit)
Dde Photo-diode
C_low first capacitance (low value)
C_high second capacitance (higher value)
T_sw pixel-mode switching transistor
V_slh pixel-mode switching signal
Vp pixel potential
T_res reset transistor
V_res reset signal
V_ref pixel reference potential
T_sf source-follower (transistor)

V_out output voltage
$Q_{max}$ maximum detectable charge in pixel
$n_{elec}$ minimum detectable charge in pixel (determined by noise level)
k constant of Bolzmann
T absolute temperature
SS small signals
LS large signals
AS all signals (possible due the invention)
C_high' sum of first capacitance and second capacitance
DR dynamic range
DR' increased dynamic range (due the invention)
$V_{nse}$ read noise (due to read circuit)
Sub substrate
EPI epitaxial layer
Edpl edge of depletion region in low-doped EPI layer
V_ch maximum channel potential
X position along indicated path AA' (measured orthogonal to substrate surface)
V_wll well potential
COL column read-out circuit
$I_{bias}$ bias current in read-out circuit
T_sel pixel selection transistor
SEL selection signal
C_sgl first read-out capacitance in read-out circuit
C_sgh second read-out capacitance in read-out circuit
C_refh third read-out capacitance in read-out circuit
C_refl fourth read-out capacitance in read-out circuit
SW1 first switch in read-out circuit
SW2 second switch in read-out circuit
SW3 third switch in read-out circuit
SW4 fourth switch in read-out circuit
CS_sgl control signal for first read-out capacitance in read-out circuit for first-mode pixel potential
CS_sgh control signal for second read-out capacitance in read-out circuit for second mode pixel potential
CS_refh control signal for third read-out capacitance in read-out circuit for second-mode reference potential
CS_refl control signal for fourth read-out capacitance in read-out circuit for first-mode reference potential
EOI end of integration
BOI begin of integration
V_sgl output signal stored in first read-out capacitance in read-out circuit (low full-well signal potential)
V_sgh output signal stored in second read-out capacitance in read-out circuit (high full-well signal potential)
V_refh output signal stored in third read-out capacitance in read-out circuit (high full-well reference potential)
V_refl output signal stored in fourth read-out capacitance in read-out circuit (low full-well reference potential)
V_lfw first-mode pixel signal
V_hfw second-mode pixel signal
V_sat pixel saturation voltage
GN gain

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

Figure 1:
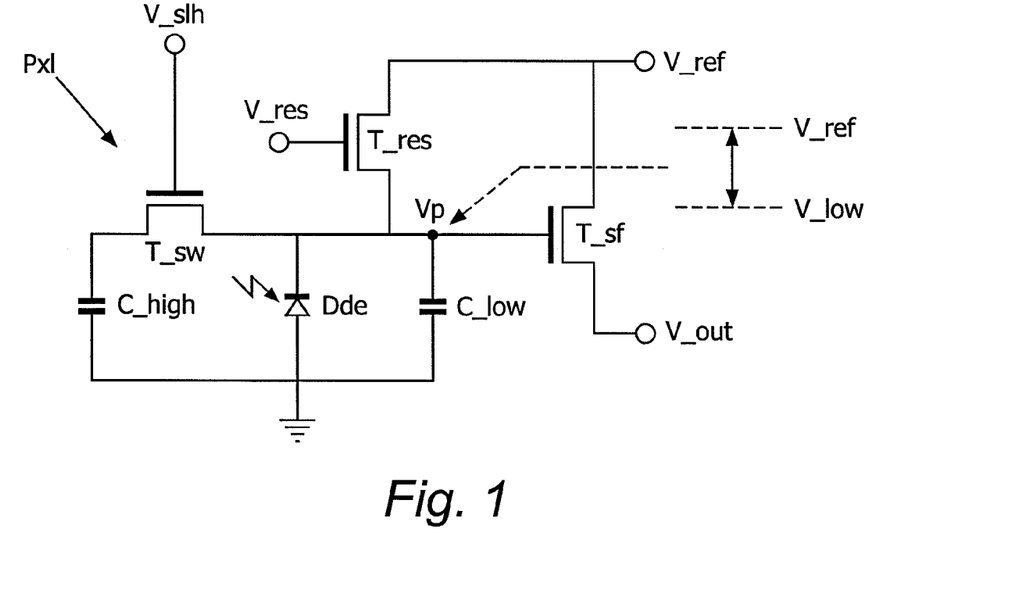
FIG. 1 shows a pixel region of a known image sensor having two operational modes (switchable full-well)

FIG. 1 shows a pixel region of a known image sensor having two operational modes. The figure discloses a pixel Pxl comprising a largely-pinned photo-diode Dde with a first capacitance C_low arranged in parallel. A second capacitance C_high can be arranged in parallel to the first capacitance C_low by means of closing a pixel-mode switching transistor T_sw. The gate of the pixel-mode switching transistor T_sw is controlled by a pixel-mode switching signal V_slh. The photo-diode Dde is connected between an internal node and ground such that in operational use of the pixel it is reverse-biased. The internal node has a pixel potential Vp, which is the potential indicative for the light that is sensed by the photo-diode Dde. The internal node is coupled to a pixel reference potential V_ref via a reset transistor T_res which is controlled by a reset signal V_res. The pixel potential Vp is coupled to an output of the pixel Pxl via a source-follower transistor T_sf as illustrated in the figure. Each pixel Pxl is also provided with a selection transistor (not shown) coupled to the source of the source-follower transistor T_sf. How pixels Pxl are selected while reading out a CMOS image sensor is considered to be well-known to the person skilled in the art.

The pixel is, depending on the application, set in either low full-well mode (by disabling the pixel-mode switching transistor T_sw) or in high full-well mode (by activating the pixel-mode switching transistor T_sw).

Once set in one of these modes, the pixel Pxl in FIG. 1 is operated as follows.

In a first step, the pixel Pxl is reset by temporarily activating (making conductive) the reset transistor T_res through a voltage pulse V_res on its gate. By doing so the pixel potential Vp is set on the reference voltage V_ref, which is typically 3V. In this step the pixel potential Vp is also set over the respective capacitance (C_low) or capacitances (C_low, C_high).

As a second step the integration is started, i.e. the photo diode Dde captures light and generates charge carriers. The charge carriers will discharge the respective capacitance (C_low) or capacitances (C_low, C_high). Expressed differently, the voltage drop on the internal node is indicative for the amount of charge generated by the photo-diode Dde, and thus the amount of light captured by the pixel. Thus, it is the voltage swing on the internal node which is the quantity of interest. This voltage swing is determined by means of the steps described hereinafter.

As a third step the pixel potential Vp (after integration) is read-out and stored on a first capacitor (not shown) in the read-out circuit (not shown).

As a fourth step the pixel Pxl is reset again by temporarily activating (making conductive) the reset transistor T_res through a voltage pulse V_res on its gate. By doing so the pixel potential Vp is again set on the reference voltage V_ref, which is typically 3V. In this step the pixel potential Vp is also set over the respective capacitance (C_low) or capacitances (C_low, C_high).

As a fifth step the pixel potential Vp (after integration) is again read-out and stored on a second capacitor (not shown) in the read-out circuit (not shown).

As a sixth step the difference between the potential on the first capacitance and the potential on the second capacitance is measured. This difference is indicative for the amount of light that was captured by photo-diode Dde of the pixel Pxl.

Figure 2:
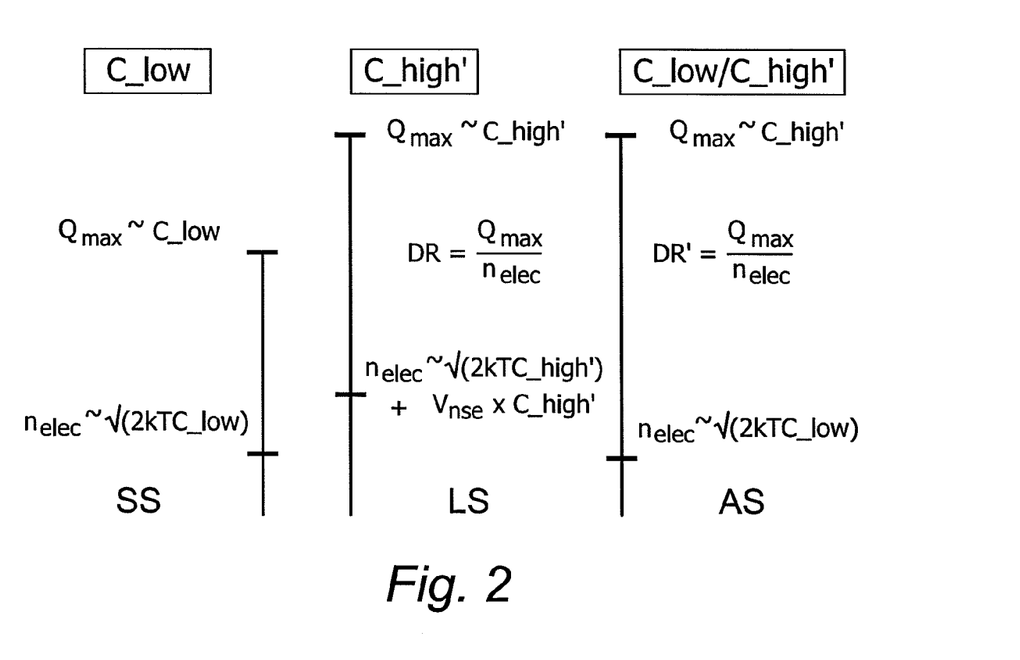
FIG. 2 illustrates some aspects of the invention.

FIG. 2 illustrates some aspects of the invention. The figure illustrates the detection range of the pixel Pxl of FIG. 1 expressed in the number of charge carriers that are captured by the photo diode. On the left hand side of the figure there is illustrated the situation when there are small signals SS (low light intensity) to be detected. In such situation the pixel Pxl is used in the low full-well mode, i.e. the pixel-mode switching transistor T_sw is switched off and the second capacitance C_high is not used.

In the low full-well mode the lower limit of the detection range is determined by the noise floor of the pixel Pxl. This noise floor (expressed in electrons) is typically determined by the root of the value of first capacitance according to the relation as illustrated in FIG. 2, wherein there is also the Bolzmann constant k and the temperature T. Now, when the first capacitance C_low is small the number of electrons $n_{elec}$ which is required to exceed the noise floor is also low. In fact there is also a contribution of noise generated by the read-out circuit. Typically this noise is approximately 200 µV. As this noise is independent from the pixel circuit used, it is possible to express this noise in a minimum number of electrons in the pixel that is required to exceed this noise level using the expression Q=C*V, wherein Q is the charge, C is the capacitance and V is voltage. In case of a very small first capacitance C_low this later contribution is negligible with regards to the noise component generated by the capacitor. Hence, the less complex formula on the left hand side.

In the low full-well mode the upper limit of the detection range is determined by the first capacitance C_low in conjunction with the maximum voltage swing. However, in the low full-well mode this capacitance has a very low value (to keep the noise floor low) and thus the maximum number of charge carriers $Q_{max}$ is also low, i.e. and thus also the maximum light intensity which can be detected.

In order to be able to detect large signals LS (higher light intensities), the pixel Pxl should be switched to the high full-well mode by activating the pixel-mode switching transistor T_sw. This is illustrated in the middle of FIG. 2 which illustrates the situation when there are large signals LS (high light intensity) to be detected. In such situation the pixel Pxl is used in the high-well mode, i.e. the pixel-mode switching transistor T_sw is switched on and the second capacitance C_high is arranged parallel to the first capacitance L_low.

In the high full-well mode the upper limit of the detection range is determined by the sum C_high' of the first capacitance and the second capacitance. In case the second capacitance C_high is 10 times larger than the first capacitance C_low, for example, then the maximum charge which may be detected is multiplied by 11, assuming the same voltage swing.

However, the lower limit of the detection range has also increased due to an increased noise floor of the pixel Pxl. This noise floor (expressed in electrons) is typically determined by the root of the value of sum C_high' of the first capacitance and the second capacitance according to the relation as illustrated in FIG. 2, wherein there is also the Bolzmann constant k and the temperature T. Now, the summed capacitance C_high' is larger the number of electrons $n_{elec}$ which is required to exceed the noise floor is also larger. Furthermore, there is a contribution of the noise $V_{nse}$ generated by the read-out circuit. Typically this noise is approximately 200 µV. Similarly, it is possible to express this noise in a minimum number of electrons in the pixel that is required to exceed this noise level using the earlier-mentioned expression Q=C*V. In this case this contribution is no longer negligible with regards to the noise component generated by the capacitor. Hence, the more complex formula in the middle illustration.

As already discussed in the prior art the pixel circuit of FIG. 1 is used in either one of the modes, depending on the application. However, the dynamic range DR, which is defined as the maximum detectable charge $Q_{max}$ divided by the minimum detectable charge $n_{elec}$, is hardly or just little increased in the high-full well mode.

The inventor has realized that the circuit of FIG. 1 can be used in a more clever way, such that an increased dynamic range DR' is obtained. Expressed differently, the circuit may be used such that the maximum detectable charge $Q_{max}$ of the high full-well mode is combined with the minimum detectable charge $n_{elec}$, in the low full-well mode, which renders the pixel circuit Pxl suitable for effectively all signals AS. This is illustrated on the right-hand side of FIG. 2.

Figure 3:
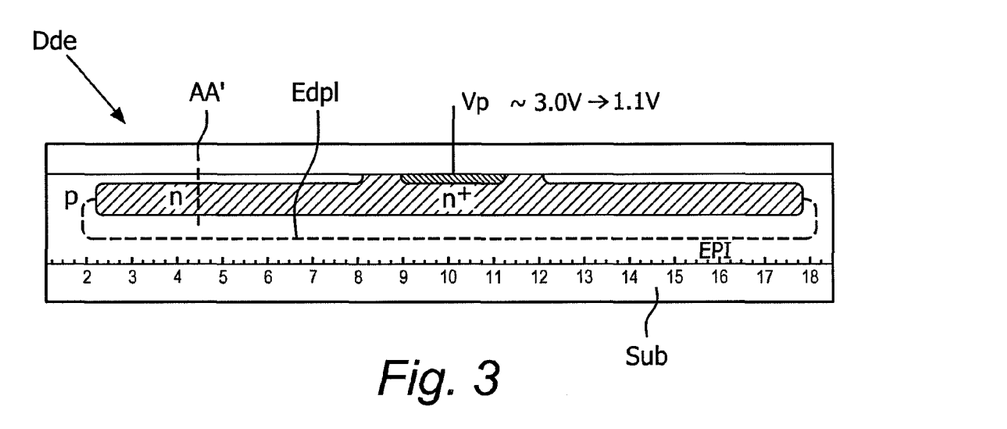
FIG. 3 shows an example of a largely-pinned photo-diode.

FIG. 3 shows an example of a largely-pinned photo-diode. The largely pinned photo-diode Dde has the advantage that its capacitance reduces to zero above a certain predefined voltage. When the photo-diode is used in that regime, it generates charge carriers, but does not substantially store those charge carriers. The largely-pinned photo-diode Dde is manufactured in a substrate Sub comprising an epitaxial layer EPI, which is p-type semiconductor material in this example. Within the epitaxial layer EPI an n-type region is formed as illustrated in the figure. The consequence of this device architecture is that in a direction perpendicular to the surface of the substrate along line AA' two pn-junctions are present and thus also two depletion regions within the n-type region. One of the edges Edpl of the depletion region in the p-type region has been drawn. The higher the potential of the n-type region with respect to the substrate potential (reverse-biasing), the thicker the depletion regions become. At a certain reverse-bias voltage the depletion regions touch each other. From that voltage onward the parasitic capacitance of the diode Dde drops to very low levels.

In the middle the n-type region is contacted though a highly-doped n-type region. This region forms the cathode of the photo-diode Dde. In operational use this region carries the pixel potential Vp. Typically this pixel potential Vp is within the range from the reference potential V_ref (in case of darkness) to about 1.1V (in case of maximum light intensity). When the pinning potential of the photo-diode Dde is chosen below the lower limit of the operation range, the diode will initially not store any charges which are liberated by incoming photons.

Figure 4:
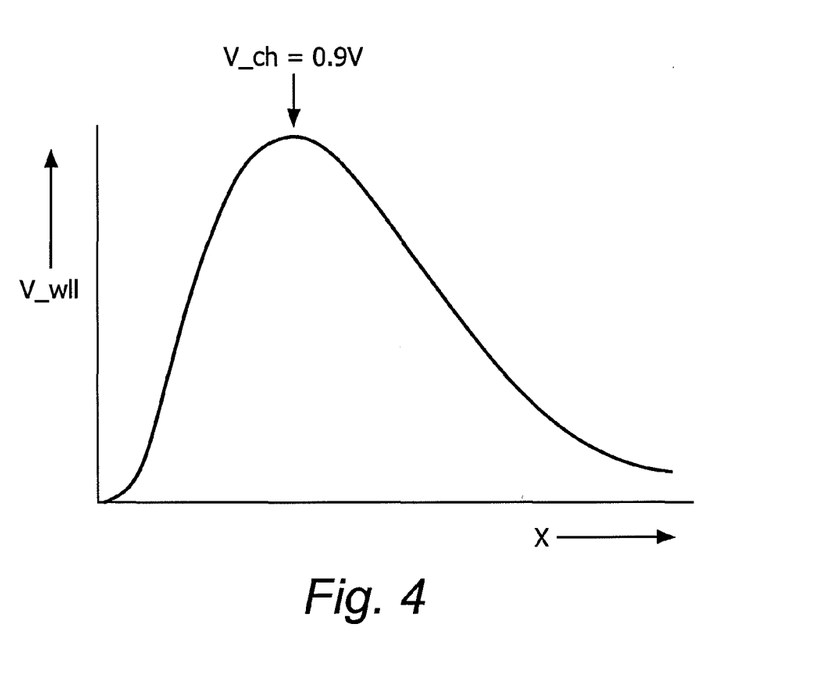
FIG. 4 shows a voltage-versus-location curve of the largely-pinned photo diode along path AA'.
Figure 5:
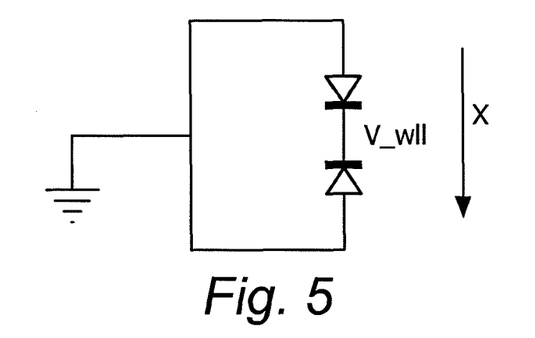
FIG. 5 illustrates an equivalent circuit of the largely-pinned photo diode of FIG. 3 considered along path AA'.

FIG. 4 shows a voltage-versus-location curve of the largely-pinned photo diode along path AA'. FIG. 5 illustrates an equivalent circuit of the largely-pinned photo diode of FIG. 3 considered along path AA'. As mentioned earlier effectively two pn-junctions (diodes) are formed along this path. These diodes share their cathodes and their anodes are connected together via the p-type region as illustrated in FIG. 5. FIG. 4 shows the well potential V_wll as a function of the position X along the path AA'. Clearly, there is a maximum channel potential V_ch which is about 0.9V. This voltage is equal to the pinning potential and will not get higher because all mobile electrons are depleted.

Referring back to FIG. 2, the invention provides an increased dynamic range of the pixel circuit Pxl benefiting from the advantages of each operational mode. The invention effectively provides a method of reading out a CMOS image sensor as illustrated in FIG. 1. This method will be explained in as far as it differs from the method as discussed with regards to FIG. 1.

A first main difference is that the first reset step is done such that both the first capacitance and the second capacitance are charged to pixel reference potential V_ref.

A second main difference is that the integration phase is done in the low full-well mode, i.e. with the first capacitance parallel to the diode Dde only.

A third main difference is that in the invention excess charge (which may be quickly reached in low full-well mode) is intentionally stored in the photo-diode Dde.

Each read-out step discussed earlier is carried out twice sequentially, namely one time in low full-well mode, and one time in high full-well mode, and each measurement is stored in a different capacitance in the read-out circuits. Four measurements are obtained in this way. It is interesting to note that in case excess charge that is stored in the photo diode (saturation) the invention reuses this charge when the second capacitance C-high is switched parallel to the first capacitance C_low. Expressed differently, the charge then moves from the diode Dde to the second capacitance effectively putting the diode back into its depleted region and enabling to do the second measurement without saturation to occur.

Figure 6:
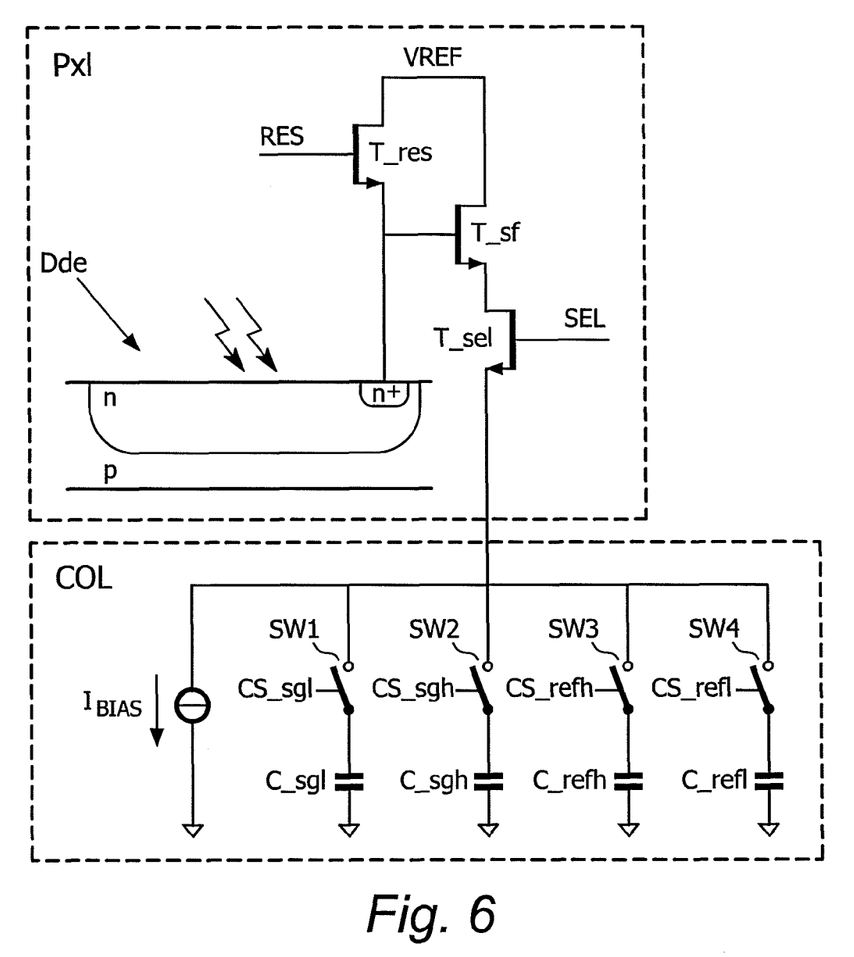
FIG. 6 shows an implementation of the read-out circuit in accordance with the invention.
Figure 8:
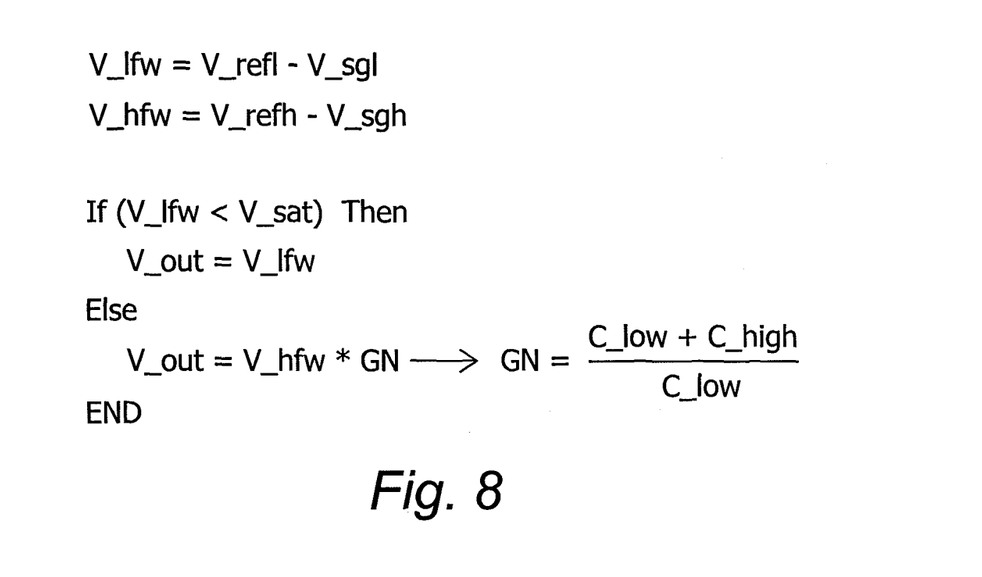
FIG. 8 illustrates some aspects of the read-out strategy in accordance with the invention.

FIG. 6 shows an implementation of the read-out circuit in accordance with the invention. FIG. 8 illustrates some aspects of the read-out strategy in accordance with the invention. FIG. 6 shows a pixel circuit Pxl in which the capacitances (C_low, C_high) have been left out for simplicity reasons. What is also shown in the pixel Pxl is the pixel selection transistor T_sel and the selection signal SEL that is controlling the gate thereof. The figure further shows a column read-out circuit COL comprising a current source for providing a bias current $I_{bias}$ through the column line. The column read-out circuit COL further comprises four respective capacitances (C_sgl, C_sgh, C_refh, C_refl) with respective switches connected in series for allowing the storage of respective measured voltages thereon. A first read-out capacitance C_sgl is for storing a first potential V_sgl in low full-well mode. A second read-out capacitance C_sgh is for storing a second potential V_sgh in high full-well mode. A third read-out capacitance C_refh is for storing a third potential V_refh (reference potential) in high full-well mode. A fourth read-out capacitance C_refl is for storing a fourth potential V_refl (reference potential) in low full-well mode. The first switch SW1 is controlled by a first control signal CS_sgl to store the first potential V_sgl in low full-well mode. The second switch SW2 is controlled by a second control signal CS_sgh to store the second potential V_sgh in high full-well mode. The third switch SW3 is controlled by a third control signal CS_refh to store the third potential V_refh in high full-well mode. The fourth switch SW4 is controlled by a fourth control signal CS_refl to store the third potential V_refl in low full-well mode.

Figure 7:
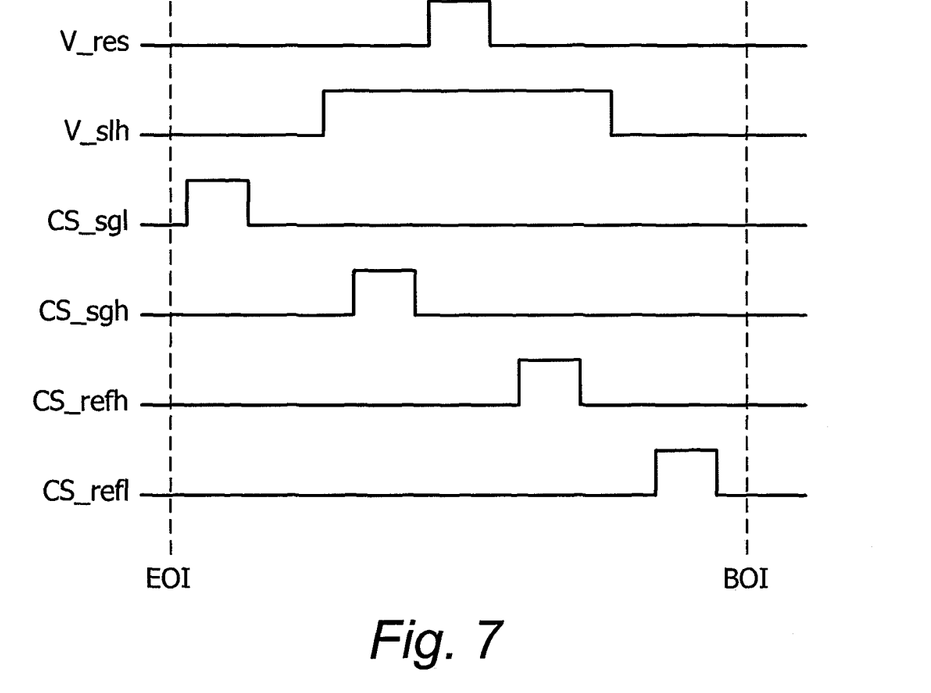
FIG. 7 shows a pulse pattern in accordance with an embodiment of the invention.

FIG. 7 shows a pulse pattern in accordance with an embodiment of the invention. The pixel-mode switching signal V_slh illustrates an interesting embodiment of the method, namely that the second and the third measurement are both done in high full-well mode, which effectively safes one transition between the modes. This is, however, not essential to the invention. The respective control signals CS_sgl, CS_sgh, CS_refh, CS_refl indicate the moments when the pixel potential Vp is stored on the respective capacitances C_sgl, C_sgh, C_refh, C_refl. The first dashed line on the left side indicates the end EOI of the actual integration phase being read-out and the second dashed line on the right side indicates the start BOI of the next integration phase.

FIG. 8 illustrates some aspects of the read-out strategy in accordance with the invention. From the four measurements two pixel signals are calculated as illustrated in the figure. A first-mode pixel signal V_lfw (low full-well) is determined by subtracting the low full-well reference potential V_sgl from the low full-well signal potential V_refl. A second-mode pixel signal V_hfw (high full-well) is determined by subtracting the high-full well signal potential V_sgh from the high full-well reference potential V_refh. The decision of which of these measurements to take is done by investigating the value V_lfw of the low full-well output first. If this value V_lfw is near saturation (i.e. the voltage swing is larger than a predefined threshold V_sat), the value V_hfw of the high full-well is selected, or else the value V_lfw of the low full-well is taken. In case the high full-well value is taken, the value must be compensated by multiplying with the gain factor GN, which is the ratio between the sum of the first and the second capacitance and the first capacitance (i.e. this is the inverse of the attenuation of the signal due to putting the second capacitance parallel to the first capacitance). In other words, the gain between the two values must be taken into account before reconstructing the final image. This gain correction can be done simultaneously with the normal offset, gain and linearity correction on the image. Alternatively, this can be done off-chip.

The invention thus provides for a high dynamic range at the expense of a dual read-out (which is to be distinguished from a dual frame rate CMOS imager). The invention relies upon the effect that despite the integration in the low full-well mode, additional charge may be stored in the photo diode (the fact that this is a non-linear behavior is not a problem). Typically around 1 Ke$^-$ per μm$^2$ of charge may be stored in the photo diode. In an example implementation of the CMOS imager of the invention the maximum low full-well capacity is 200 Ke$^-$, while the maximum high full-well capacity is 1 Ke$^-$*135*135 (=diode size)=18 Me$^-$. This means that the dynamic range has been increased with a factor of 18M/200K=90=39 dB!!.

Other aspects such related to the reading out of an image sensor are considered to be well-known to the person skilled in the art and are therefore not explained in this description.

It should be noted that the above-mentioned embodiments illustrate rather than limit the invention, and that those skilled in the art will be able to design many alternative embodiments. It must be stressed that despite the fact that the pixel circuit as such may be known from the prior art, the invention nevertheless relates to a CMOS image sensor as such, because the read-out circuit is characterized by the invention as such. And this is even more true for specific embodiments, wherein also the pixel is further improved. For instance, the pixel may be adapted with a further capacitance and a further switch such that another mode (for instance mid-well) is possible. Other variations are possible in the sense that the read-out circuit may comprise more or less capacitances than the numbers mentioned in the description. It may even be possible to store all measurements on the same capacitance, which is subsequently read-out, wherein the value is stored in a memory for instance of a computer.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of reading out a CMOS image sensor, the CMOS image sensor comprising an array of pixels (Pxl) for sensing incident light, wherein each pixel (Pxl) comprises a largely-pinned photo-diode (Dde) arranged in reverse-bias, a first capacitance (C_low) arranged parallel to the largely-pinned photo-diode (Ddw), a switch (T_sw), a second capacitance (C_high) that can be switched in parallel with the first capacitance (C_low) by closing the switch (T_sw), and reset circuitry (T_res) for resetting a pixel potential (Vp) on a cathode of the largely-pinned photo diode (Dde) to a predefined voltage (V_ref), wherein each respective pixel (Pxl) can be set in a second mode (LS) by switching on the switch (T_sw) and thereby switching the second capacitance (C_high) parallel to the first capacitance (C_low), and wherein each respective pixel (Pxl) can be set in a first mode (SS) by switching off the switch (T_sw) disabling the second capacitance (C_high), the method comprising:

setting a respective pixel (Pxl) in the first mode (SS);

resetting the respective pixel (Pxl) such that the predefined voltage (V_ref) is set over the largely-pinned photodiode (Dde) and the first capacitance (C_low);

collecting charge carriers generated by the incident light on the largely-pinned photodiode (Dde), wherein the collected charge carriers reduce the pixel potential (Vp) on the largely-pinned photo-diode (Dde);

reading out the respective pixel (Pxl) while set in the first mode (SS) and storing the pixel potential (Vp) that was read as a first potential value;

reading out the respective pixel (Pxl) while set in the second mode (LS) and storing the pixel potential (Vp) that was read as a second potential value;

resetting the respective pixel (Pxl) such that the predefined voltage (V_ref) is set over the largely-pinned photodiode (Dde), the first capacitance (C_low), and the second capacitance (C_high);

reading out the respective pixel (Pxl) while set in the second mode (LS) and storing the pixel potential (Vp) that was read as a third potential value; and reading out the respective pixel (Pxl) while set in the first mode (SS) and storing the pixel potential (Vp) that was read as a fourth potential value, and wherein a pinning potential of the largely-pinned photodiode (Dde) is lower than a lower limit of a linear range of the pixel potential (Vp) such that within the linear range of the pixel potential (Vp) the photo-diode (Dde) does not substantially store the charge carriers generated by the incident light.

2. The method as claimed in claim 1, wherein each pixel (Pxl) within the CMOS image sensor further comprises a further switch and a third capacitance that can be switched in parallel with the first capacitance (C_low) and the second capacitance (C_high) by closing both the switch (T_sw) and the further switch, wherein the respective pixel (Pxl) can be set in a third mode by switching on both the switch (T_sw) and the further switch and thereby switching the third capacitance parallel to the first capacitance (C_low) and the second capacitance (C_high), the method further comprising, before resetting the respective pixel (Pxl), reading out the respective pixel (Pxl) while set in the third mode and storing the pixel potential (Vp) that was read as a fifth potential value;

the method further comprising, after resetting the respective pixel (Pxl), reading out the respective pixel (Pxl) while set in the third mode and storing the pixel potential (Vp) that was read as a sixth potential value, and wherein, while resetting the respective pixel (Pxl), the predefined voltage (V_ref) is set over the third capacitance as well.

3. A CMOS image sensor comprising an array of pixels (Pxl) for sensing incident light, wherein each pixel (Pxl) comprises a largely-pinned photo-diode (Dde) arranged in reverse-bias, a first capacitance (C_low) arranged parallel to the largely-pinned photo-diode (Dde), a switch (T_sw), a second capacitance (C_high) that can be switched in parallel with the first capacitance (C_low) by closing the switch (T_sw), and reset circuitry (T_res) for resetting a pixel potential (Vp) on a cathode of the largely-pinned photo diode (Dde) to a predefined voltage (V_ref), wherein each respective pixel (Pxl) can be set in a second mode (LS) by switching on the switch (T_sw) and thereby switching the second capacitance (C_high) parallel to the first capacitance (C_low), and wherein each respective pixel (Pxl) can be set in a first mode (SS) by switching off the switch (T_sw) disabling the second capacitance (C_high), wherein the CMOS image sensor further comprises a read-out circuit that is coupled to the array of pixels (Pxl), and wherein the CMOS image sensor is configured for reading out and storing respective pixel potentials of the array of pixels (Pxl) in different modes, wherein a pinning potential of the photodiode (Dde) is lower than a lower limit of a linear range of the pixel potential (Vp) such that within the linear range of the pixel potential (Vp) the photo-diode (Dde) does not substantially store charge carriers generated by the incident light.

4. The CMOS image sensor as claimed in claim 3, wherein the second capacitance (C_high) is equal to or larger than the first capacitance (C_low).

5. The CMOS image sensor as claimed in claim 3, wherein the read-out circuit comprises:

a first capacitor (C_sgl) for storing a first potential value;

a second capacitor (C_sgh) for storing a second potential value;

a third capacitor (C_refh) for storing a third potential value; and a fourth capacitor (C_rel) for storing a fourth potential value.

6. The CMOS image sensor as claimed in claim 5, wherein each pixel (Pxl) within the CMOS image sensor further comprises a further switch and a third capacitance that can be switched in parallel with the first capacitance (C_low) and the second capacitance (C_high) by closing both the switch (T_sw) and the further switch, wherein each respective pixel (Pxl) can be set in a third mode by switching on both the switch (T_sw) and the further switch and thereby switching the third capacitance parallel to the first capacitance (C_low) and the second capacitance (C_high).

7. The CMOS image sensor as claimed in claim 6, wherein the read-out circuit further comprises:

a fifth capacitor for storing a fifth potential value; and a sixth capacitor for storing a sixth potential value.

8. The method as claimed in claim 1, wherein the largely-pinned photo-diode (Dde) is formed between a substrate (Sub) comprising a p-type semiconductor material (EPI), and a n-type region formed within the p-type semiconductor material (EPI), arranged such that in a direction (AA') perpendicular to a surface of the substrate (Sub) two p-n junctions as well as two depletion regions within the n-type region are formed, wherein the two depletion regions touch each other when a potential of the n-type region with respect to a substrate potential is higher than the pinning potential thereby causing the largely-pinned photo-diode (Dde) to have a parasitic capacitance with a very low level, and wherein the n-type region is connected to carry the pixel potential (Vp).

9. The method as claimed in claim 1, wherein the second capacitance (C_high) is equal to or larger than the first capacitance (C_low).

* * * * *